United States Patent
Woodworth et al.

(10) Patent No.: US 12,438,907 B2
(45) Date of Patent: Oct. 7, 2025

(54) SYSTEMS AND METHODS FOR MITIGATING DOMAIN NAME SYSTEM AMPLIFICATION ATTACKS

(71) Applicant: CenturyLink Intellectual Property LLC, Broomfield, CO (US)

(72) Inventors: John R. B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 235 days.

(21) Appl. No.: 18/360,931

(22) Filed: Jul. 28, 2023

(65) Prior Publication Data

US 2024/0048587 A1 Feb. 8, 2024

Related U.S. Application Data

(60) Provisional application No. 63/370,135, filed on Aug. 2, 2022.

(51) Int. Cl.
*H04L 9/40* (2022.01)

(52) U.S. Cl.
CPC ...... *H04L 63/1458* (2013.01); *H04L 63/1416* (2013.01); *H04L 63/1425* (2013.01)

(58) Field of Classification Search
CPC ............. H04L 63/1458; H04L 63/1416; H04L 63/1425; H04L 63/1408; H04L 61/4511; H04L 63/1466; H04L 63/1441
See application file for complete search history.

(56) References Cited

U.S. PATENT DOCUMENTS

| | | |
|---|---|---|
| 2008/0104182 A1 | 5/2008 | Jimmei |
| 2012/0102016 A1* | 4/2012 | Balogh ................. G06F 9/546 707/706 |
| 2016/0036837 A1* | 2/2016 | Jain .................... H04L 63/1416 726/23 |
| 2016/0099852 A1* | 4/2016 | Cook ................. H04L 47/2425 709/224 |
| 2018/0248906 A1 | 8/2018 | Scherman |
| 2020/0204581 A1* | 6/2020 | Manadhata ......... H04L 61/4511 |
| 2021/0112091 A1* | 4/2021 | Compton ............ H04L 63/1416 |

OTHER PUBLICATIONS

International Search Report and Written Opinion of the International Searching Authority, dated Dec. 4, 2023, Int'l Appl. No. PCT/US2023/071170, Int'l Filing Date Jul. 28, 2023; 14 pgs.

\* cited by examiner

*Primary Examiner* — Joe Chacko

(57) ABSTRACT

Systems and methods for mitigating DNS amplification attacks are provided. In one example, a threat intelligence system collects data about the requests received by a DNS server, and/or responses generated by the DNS server. The threat intelligence system triggers a threat mitigation action upon detecting evidence (in one or more forms) of a DNS amplification attack. The threat mitigation action may include filtering DNS responses generated by the DNS server. The filtering rule may indicate that a DNS response in which the payload size is above a threshold payload size is to be dropped. In examples, the payload threshold size is dynamically set by the threat intelligence system using a machine learning model to minimize the filtering of DNS responses for valid DNS queries, while maximizing filtering of DNS responses for malicious DNS queries.

19 Claims, 4 Drawing Sheets

SYSTEMS AND METHODS FOR MITIGATING DOMAIN NAME SYSTEM AMPLIFICATION ATTACKS

CROSS-REFERENCE TO RELATED APPLICATIONS

This application claims the benefit of U.S. Provisional Application No. 63/370,135 filed Aug. 2, 2022, entitled "Systems and Methods for Mitigating Domain Name System Amplification Attacks," which is incorporated herein by reference in its entirety.

FIELD

One or more aspects of embodiments according to the present disclosure relate to distributed denial of service attacks, and more particularly, to mitigating domain name system amplification attacks.

BACKGROUND

Communications networks have increased in complexity. For example, large communication networks may process millions of queries (or more) per second. Malicious actors routinely attempt to circumvent security measures of communications networks and/or cause communications network failures. For example, denial of service (DoS) and distributed denial of service (DDoS) attacks have become commonplace. DDoS attacks attempt to overwhelm network components (such as domain name system (DNS) servers) or applications by flooding the network components or applications with superfluous requests in an attempt to overload the network, network components, or applications and prevent legitimate requests from being fulfilled.

In a domain name system (DNS) amplification attack, an attacker may send relatively small queries to a DNS server. The queries may include a spoofed Internet Protocol (IP) address of a target server to cause responses to the queries to be sent to the target server instead of the attacker. The responses may be substantially large or amplified responses that may overwhelm the target server or network and may render the target server and its surrounding infrastructure, inaccessible.

The above information disclosed in this Background section is only for enhancement of understanding of the background of the present disclosure, and therefore, it may contain information that does not form prior art.

SUMMARY

In an aspect, the present technology includes a method comprising: analyzing network traffic information; identifying a domain name system (DNS) amplification attack based on the network traffic information; in response to identifying the DNS amplification attack, invoking a threat mitigation action; receiving a domain name system (DNS) query from a source address; determining, by a DNS server, that a payload size of a response to the DNS query exceeds a threshold payload size; and dropping the response to the DNS query based on the threat mitigation action.

In an example, and in combination with any of the above aspects and examples, the detecting of the DNS amplification attack includes: identifying a rate of traffic from the source address for a certain period of time; and determining that the rate of the traffic exceeds a threshold rate.

In another example, and in combination with any of the above aspects and examples, the detecting of the DNS amplification attack includes: examining payloads of a plurality of first responses generated by the DNS server for a certain period of time; and determining that one or more payloads of the plurality of first responses exceeds the threshold payload size.

In another example, and in combination with any of the above aspects and examples, the detecting of the DNS amplification attack includes: determining a historical ratio based on one or more historical DNS queries and one or more historical responses; determining a current ratio based on recent DNS queries and their associated DNS responses during a particular time period; and determining that a difference between the current ratio and the historical ratio exceeds a threshold value.

In another example, and in combination with any of the above aspects and examples, the threat mitigation action includes deploying a filtering rule to filter the response to the DNS query.

In another example, and in combination with any of the above aspects and examples, the filtering rule is deployed on a router for filtering the response to the DNS query.

In another example, and in combination with any of the above aspects and examples, the filtering rule is deployed on the DNS server for filtering the response to the DNS query.

In another example, and in combination with any of the above aspects and examples, the filtering rule includes the source address and the threshold payload size.

In another example, and in combination with any of the above aspects and examples, the method further includes determining the threshold payload size dynamically based on a machine learning model and previous responses to DNS queries within a specified time period.

In another example, and in combination with any of the above aspects and examples, the DNS server calculates an anticipated payload size of the response prior to generating the response and wherein dropping the response to the DNS query comprises not generating the response.

In another aspect, the present technology includes system, comprising: at least one processor; and memory, storing instructions that, when executed by the at least one processor, cause the system to perform a method. In an example, the method comprises: analyzing network traffic information; identifying a domain name system (DNS) amplification attack based on the network traffic information; in response to identifying the DNS amplification attack, invoking a threat mitigation action; receiving a domain name system (DNS) query from a source address; determining, by a DNS server, that a payload size of a response to the DNS query exceeds a threshold payload size; and dropping the response to the DNS query based on the threat mitigation action.

In another example, and in combination with any of the above aspects and examples, the detecting of the DNS amplification attack includes: identifying a rate of traffic from the source address for a certain period of time; and determining that the rate of the traffic exceeds a threshold rate.

In another example, and in combination with any of the above aspects and examples, the detecting of the DNS amplification attack includes: examining payloads of a plurality of first responses generated by the DNS server for a certain period of time; and determining that one or more payloads of the plurality of first responses exceeds the threshold payload size.

In another example, and in combination with any of the above aspects and examples, the detecting of the DNS amplification attack includes: determining a historical ratio based on one or more historical DNS queries and one or more historical responses; determining a current ratio based on recent DNS queries and their associated DNS responses during a particular time period; and determining that a difference between the current ratio and the historical ratio exceeds a threshold value.

In another example, and in combination with any of the above aspects and examples, the threat mitigation action includes deploying a filtering rule to filter the response to the DNS query.

In another example, and in combination with any of the above aspects and examples, the filtering rule is deployed on a router for filtering the response to the DNS query.

In another example, and in combination with any of the above aspects and examples, the filtering rule is deployed on the DNS server for filtering the response to the DNS query.

In another example, and in combination with any of the above aspects and examples, the filtering rule includes the source address and the threshold payload size.

In another example, and in combination with any of the above aspects and examples, the method further comprises determining the threshold payload size dynamically based on a machine learning model and previous responses to DNS queries within a specified time period.

In another the present technology includes a system, comprising: at least one processor; and memory, storing instructions that, when executed by the at least one processor, cause the system to perform a method. In an example, the method comprises: analyzing network traffic information; identifying a domain name system (DNS) amplification attack based on the network traffic information; determining a threshold payload size dynamically based on a machine learning model and the network traffic information received within a specified first period; in response to identifying the DNS amplification attack, invoking a threat mitigation action, including distributing a filtering announcement to at least one network device, wherein the filtering announcement includes instructions to cause the at least one network device to: receive a current DNS query from a source address; receive a response to the current DNS query; determine that a payload size of the response to the current DNS query exceeds the threshold payload size; and drop the response to the DNS query based on determining that the payload size of the response to the current DNS query exceeds the threshold payload size; determining an updated threshold payload size dynamically based on the machine learning model and the network traffic information received within a specified second period; and distributing an updated filtering announcement with the updated threshold payload size to the at least one network device.

These and other features, aspects and advantages of the examples of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive examples of the present embodiments are described with reference to the following figures, wherein like reference numerals refer to like parts throughout the various views unless otherwise specified.

DETAILED DESCRIPTION

Figure 1:
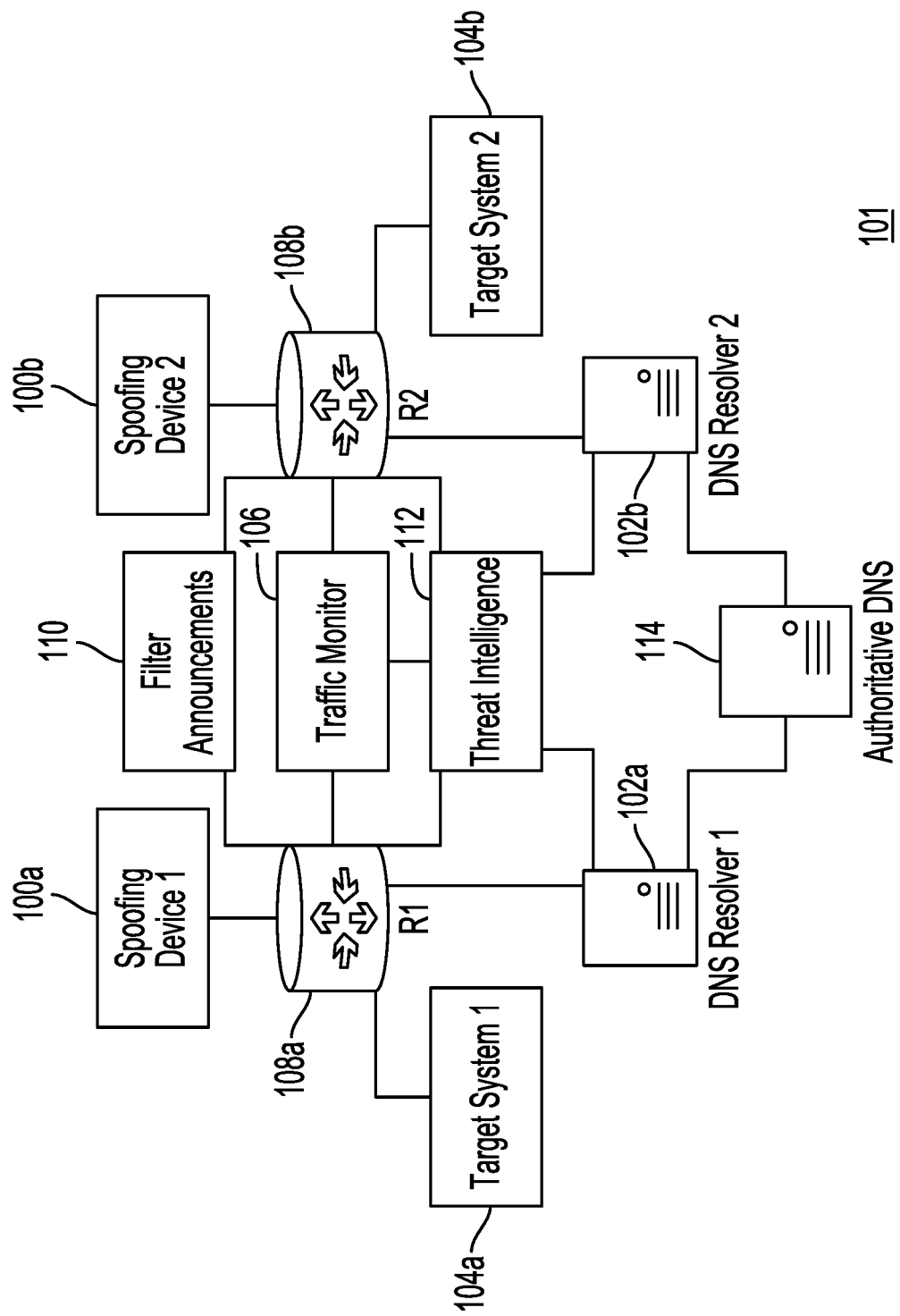
FIG. 1 is a block diagram of an example networking environment for mitigating DNS amplification attacks according to one example.

Hereinafter, examples will be described in more detail with reference to the accompanying drawings, in which like reference numbers refer to like elements throughout. The present disclosure, however, may be embodied in various different forms, and should not be construed as being limited to only the illustrated examples herein. Rather, these examples are provided so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

DoS and DDoS attacks (collectively referred to herein as DDoS attacks) that attempt to overwhelm an organization's network components (such as domain name system (DNS) servers, web or content servers, and the like) have become commonplace. When a DNS amplification attack is launched, an attacker may send requests to a DNS server/resolver with a spoofed IP address. The spoofed IP address in the requests may point to a real IP address of a victim (e.g., a target system or network). The request may be formulated so as to produce a substantially large response from the DNS resolver, which is transmitted to the target system, and may consume the target system's bandwidth. Although a few malicious requests may not be enough to take the target system down, when the requests are multiplied across multiple DNS resolvers, the amplification of data the target system receives may be substantial, causing a denial-of-service by the target system.

In general terms, examples of the present disclosure are directed to systems and methods for mitigating DNS amplification attacks. In one example, a threat intelligence system collects data about the requests received by a DNS server, and/or responses generated by the DNS server. The data may include details on the DNS queries, and details on the DNS responses generated in response to the queries. Such details may include, for example, the IP source addresses included in the queries, the size of the queries, timestamps of the queries and responses, payload sizes of the DNS responses, and/or the like.

The threat intelligence system may also collect information of traffic flowing in and out of the network (e.g., DNS and requests and responses), from a traffic monitoring system. The network flow information (e.g., collected via the NetFlow protocol) may include details on the IP source and destination addresses of the traffic, size of packets transmitted, source ports, destination ports, Layer-3 headers, protocol type, class of service, router or switch interfaces, and/or the like. The network flow information may also include information about source and target Autonomous Systems (AS) and routing specifics.

In one example, the threat intelligence system analyzes the collected data for characteristics that indicate a DNS amplification attack. For example, the threat intelligence system may analyze the data for determining a rate of requests received from a source IP address. A rate (or an increase in rate) that exceeds a threshold rate (or threshold rate of increase) over a particular period of time (such as a sliding time window) may evidence a DNS amplification attack. The threat intelligence system may also analyze a size of DNS responses generated by a DNS resolver for corresponding DNS queries. For example, a payload size of a DNS response packet that exceeds a threshold payload size may evidence a DNS amplification attack. As such, the threat intelligence system may monitor the average, median, or other measure of payload size for DNS response packets over a particular period, such as a sliding time window. Other evidence of a DNS amplification attack may be when a ratio of the size of a DNS response to a size of a corresponding DNS request (referred to as an amplification factor), exceeds a threshold amplification factor.

In one example, the threat intelligence system triggers a threat mitigation action upon detecting evidence (in one or more forms) of a DNS amplification attack. The threat mitigation action may include filtering a DNS response generated by the DNS server. The filtering may be implemented via a filtering rule configured on a router that forwards the generated DNS responses to the source IP address. The filtering rule may indicate that a DNS response directed to an IP address in which the payload size is above a threshold payload size, is to be dropped.

In some examples, the filtering may be performed by the DNS server that generates the DNS responses. The DNS server may be configured with a filtering rule that, similar to the filtering rule of the router, indicates a source IP address and threshold payload size. The filtering rule may be triggered if a DNS response generated by the DNS server contains the source IP address (for the corresponding DNS request) listed in the rule, and has a payload size greater than the threshold payload size indicated in the rule. In one example, the triggering of the rule causes the DNS server from refraining from providing the DNS response to the router for forwarding to the querying target system. In some examples, the DNS server may determine that the DNS response would, if generated, be over a threshold size, and refrain from generating the DNS response in the first place.

In one example, the payload threshold size is dynamically set by the threat intelligence system using a machine learning model. The machine learning model may be, for example, one or more deep neural networks trained using supervised and/or unsupervised learning. In this regard, the machine learning model may be trained to receive, as input, one or more characteristics of the network traffic (e.g., rate of DNS queries from a particular source IP address, payload size of DNS responses transmitted to the particular source IP addresses, ratio of payload size in DNS requests versus DNS responses, responses that contain data which is unexpected for query types, large responses with notably longer time-to-live (TTL) values, etc.), and output an optimal payload threshold size. The optimal payload threshold may be one that minimizes the filtering of DNS responses for valid DNS queries, while maximizing filtering of DNS responses for malicious DNS queries.

In some examples, the payload threshold size is set manually by a system administrator. In some examples, a different payload threshold size is set based on the characteristics of the DNS server generating the DNS responses.

FIG. 1 is a block diagram of an example networking environment 101 for mitigating DNS amplification attacks according to one example. The networking environment 101 may include any type of telecommunications network that utilizes IP addresses for connecting one or more components of the network.

In one example, the networking environment 101 includes one or more spoofing device(s) 100a, 100b (collectively referenced as 100) configured to transmit malicious DNS queries to a DNS server/resolver 102a, 102b (collectively referenced as 102) during a DNS amplification attack. The DNS resolver 102 may be configured to receive a DNS query and generate a DNS response. The DNS response may contain an address record that is responsive to the DNS query, such as, for example, the IP address of a domain name provided in the DNS query. The address record may be retrieved from a cache in the DNS resolver 102, or obtained from an authoritative DNS server 114 (or another server in a particular DNS server hierarchy).

When the query received by the DNS resolver 102 is a malicious DNS query, the size of the query may be relatively small in size (e.g. 20 bytes), while the DNS response generated in response may be substantially large (e.g. 2000 bytes or more). For example, in order to cause the DNS resolver to output the substantially large response, the spoofing device 100 may not only request an IP address resolution for a domain name, but may also request (e.g., via an "ANY" DNS query), information about the entire domain, such as, for example, information about subdomains, backup servers, mail servers, and the like. In another example, the threat actor running the spoofing device 100 may query for a substantially large record to be maliciously inserted into the DNS resolver 102, via a malicious zone they operate on an authoritative DNS server 114 resulting in the malicious DNS record to be returned in response to the DNS query.

In one example, the substantially large DNS response is returned to a compromised target system 104a, 104b (collectively referenced as 104) instead of the requesting spoofing device 100. In this regard, the DNS query that is transmitted to the DNS resolver 102 includes a source Internet Protocol (IP) address of the target system 104 under attack, instead of the IP address of the spoofing device 100. The DNS resolver 102 returns the DNS response to the source IP address in the DNS query instead of the IP address of the spoofing device 100. When multiple malicious requests generate substantially large DNS responses to the target system 104, and/or the malicious requests are multiplied across various DNS resolvers, the resources (e.g., computing, bandwidth, etc.) of the target system may be overwhelmed, causing a denial-of-service of legitimate requests by the target system 104.

Of course, the DNS resolver 102 may also receive legitimate DNS queries from the target system 104. The legitimate DNS queries may or may not require substantially large responses from the DNS resolver 102. It may be desirable to generate and transmit DNS responses for legitimate DNS queries even during a DNS amplification attack.

In one example, the network environment includes one or more traffic monitoring systems 106. The traffic monitoring system 106 may be coupled to one or more routers 108a, 108b (collectively referenced as 108) for collecting data of network flows in and out of the routers 108. In some examples, the network data is collected using the NetFlow protocol (also known as Internet Protocol Flow Information eXport, or IPFIX). In some examples, the traffic monitoring system 106 may comprise one or more NetFlow cache device and/or NetFlow collector, which is a reporting server that collects and processes traffic and exported data so that it is easier to analyze. The traffic monitoring system 106 may also comprise one or more software agent(s) operating on the routers 108 to analyze individual packets and forward network data to the NetFlow cache(s) and/or NetFlow collector(s). The network data may include, for example, data contained in packets, including a source IP address, a destination IP address, a protocol type, timestamps of the data packets in the flow, source port, destination port, and a number of bytes transmitted or received in the sampled traffic.

In one example, the routers 108 are configured to statistically sample the data packets in a network flow. For example, the routers 108 may be configured to sample 1 in N packets, where N may be set by the manufacturer or configured by network administrator. The sampling rate may be, for example, configurable in the NetFlow protocol, although embodiments are not limited thereto.

The traffic monitoring system 106 may receive and aggregate the sampled network data from the routers 108. In this regard, the traffic monitoring system 106 may generate summaries of the traffic flow based on the sampled data, e.g., using the NetFlow protocol. The summaries may include, for example, source addresses (including spoofed source addresses), destination addresses, query size information, response size information, packet size information, and/or the like.

In one example, the traffic monitoring system 106 and the DNS resolvers 102 are coupled to a threat intelligence system 112. The threat intelligence system 112 may be implemented as a stand-alone device, or incorporated into one or more components of the networking environment of FIG. 1, such as, for example, the traffic monitoring system 106.

In one example, the threat intelligence system 112 receives the network flow summaries from the traffic monitoring system 106, and information about DNS responses generated by one or more of the DNS resolvers 102, to detect a potential DNS amplification attack. In some examples, the threat intelligence system 112 receives traffic information from the routers 108 in addition or in lieu of the flow summaries from the traffic monitoring system 106. The information provided by the DNS resolvers 102 may include, for example, identification of the DNS resolvers impacted, size of received queries, timestamp of the received queries, and payload size of the DNS responses generated in response to the queries.

In one example, the threat intelligence system 112 may detect a DNS amplification attack in response to detecting a substantially increased rate of traffic from a particular IP source address during a certain window of time, and which creates substantially large responses from the DNS resolver 102. For example, the threat intelligence system 112 may identify, based on historical analysis of queries received from the particular IP source address, that the particular IP source address transmits 100 queries per second on average. If the number of queries jumps to a threshold amount (e.g., 10,000 queries per second), the threat intelligence system 112 may review the size of the DNS responses generated for the queries. If a substantial number of queries (e.g. 90% of the queries) create DNS responses with payloads higher than the threshold payload, a DNS amplification attack may be inferred. Other algorithms for detecting a DNS amplification attack are possible and contemplated.

In some examples, a DNS amplification attack may be detected in response to determining an amplification factor of the DNS response for a particular IP source address that is higher than an average amplification factor for the IP source address. The average amplification factor may be determined based on historical data collected by the traffic monitoring system 106. In one example, the amplification factor may be ratio of a size of a DNS response to the size of a DNS query. For example, if, based on historical data, the (e.g., average) amplification factor for the particular IP address is typically 1.5 (e.g., a 20 byte request creates a 30 byte response), but the (e.g., average) current amplification factor detected by the threat intelligence system 112 is now 100 (e.g., a 20 byte request creates a 2000 byte response), a DNS amplification attack may be predicted. In examples, the amplification factor may be determined as an average or median based on sampled packets over a sampling period.

In response to detecting a DNS amplification attack, the threat intelligence system 112 may be configured to take (or trigger) a threat mitigation action. In the illustrated example, threat intelligence system 112 may include an integrated threat mitigation system. In some other examples, the threat intelligence system 112 may identify threats and communicate them to a separate threat mitigation system to implement a mitigating action. The threat mitigation action may include, for example, deploying a filtering announcement 110 containing a filtering rule. In examples, the filtering announcement 110 may be a FlowSpec announcement as defined in Internet Engineering Taskforce (IETF) RFC 8955 and related specification.

In one example, the filtering announcement 110 is transmitted to the router 108 for dynamically configuring the filtering rules on the router. The filtering rules may indicate criteria that a data packet needs to satisfy in order to be filtered (e.g., dropped) by the router. For example, the criteria may be a particular IP address (e.g., the spoofed IP source address of the target system 104), and a maximum threshold payload size of the data packet before it is filtered. If a DNS response packet received by the router satisfies the particular IP address while the filtering rule is in effect, and the payload size of the packet exceeds the maximum threshold payload size, the packet is filtered and not delivered to the particular IP address. In this manner, instead of rate limiting all responses to the particular IP address during a DNS amplification attack, and disabling responses for legitimate DNS queries, only the oversized responses are blocked to prevent such packets from impacting the victim's IP address in a destructive way.

In one example, instead of configuring the filtering rule in the router 108, the filtering rule may be configured in the DNS resolver 102. Similar to the filtering rule in the router 108, the filtering rule configured in the DNS resolver 102 may cause the DNS resolver to drop a generated DNS response (or reject a request to generate a response) if the generated (or requested) response is for the IP address specified in the filtering rule, and the payload size of the generated response exceeds (or would exceed) the threshold payload size indicated in the rule.

In one example, the threat intelligence system 112 dynamically sets the threshold payload size based on network conditions. In this regard, the threat intelligence system 112 may be configured with one or more machine learning models, where the one or more machine learning models may take, as input, traffic conditions of the network, and output a recommended or optimal threshold payload size in response. The recommended threshold payload size may be one that is aimed to filter oversized DNS responses generated for malicious queries, while minimizing the filtering of DNS responses generated for valid DNS queries. For example, the machine learning model may be trained using, for example, characteristics of packets with payloads over a threshold size (e.g. over 1000 bytes), as training data. The characteristics of the packets may include source information, destination information, and/or the like.

In the example where there is not sufficient training data to train the machine learning models, the threat intelligence system 112 may be configured to start with a substantially high payload threshold. The payload threshold may be periodically or continually adjusted based on machine learning. For example, the system may iteratively modify functions and/or weights of the machine learning models based on feedback of consequences of a current threshold, to generate an optimal payload threshold value, which may be updated periodically or continually as new network traffic information is received.

The dynamic adjusting of the payload threshold value may help thwart attempts by an attacker to avoid being filtered. For example, the attacker may cause the DNS resolver to generate responses that are slightly lower than a current payload threshold value, in order to prevent the threat intelligence system 112 from detecting a DNS amplification attack. In this event, the machine learning model may, based on current network conditions, lower the payload threshold value to filter DNS responses generated based on malicious queries that are identified through other means (e.g., feedback to the threat intelligence system 112 from a network operator).

In some examples, the payload threshold value used for filtering DNS responses from one DNS resolver (e.g., DNS resolver 102a) may be different from the payload threshold value used for filtering DNS responses from a second DNS resolver (e.g., DNS resolver 102b). The difference may be based on analysis of queries handled by the different DNS resolvers and/or based on analysis of the size of DNS responses generated by the different DNS resolvers. For example, if analysis of historical data indicates that queries from a first IP source address is handled most often by DNS resolver 102a instead of DNS resolver 102b, the threshold for DNS resolver 102a may be set higher than the threshold for DNS resolver 102b. In another example, if analysis of historical data indicates that the size of DNS responses from DNS resolver 102a is larger than the size of DNS responses from DNS resolver 102b, the threshold for DNS resolver 102a may be set higher than the threshold for DNS resolver 102b.

In some examples, the machine learning model may be configured to predict, based on characteristics of the DNS request itself, whether the response that is generated will exceed the threshold. In this case, the DNS resolver need not bother generating the response, and the DNS request may simply be ignored. For example, the filtering announcement may include an instruction to the DNS resolver 102 to refuse to generate a DNS response for any DNS query that it predicts will cause the DNS response to exceed the identified threshold.

Figure 2:
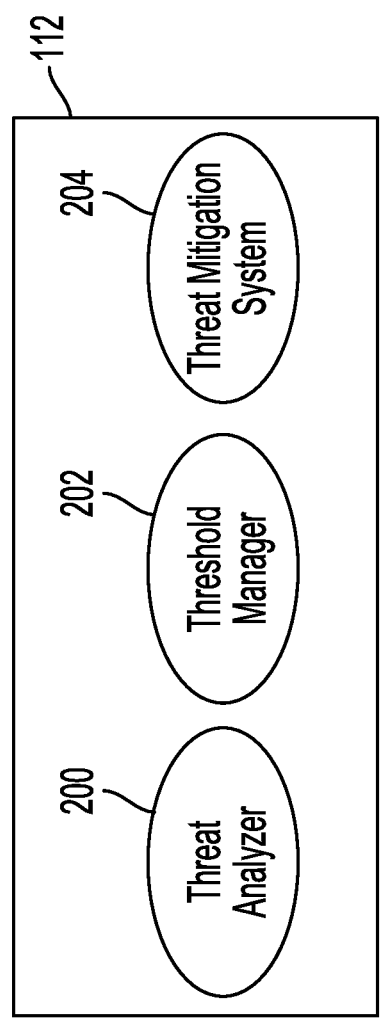
FIG. 2 is a block diagram of a threat intelligence system for mitigating DNS amplification attacks according to one example.

FIG. 2 is a block diagram of the threat intelligence system 112 for identifying, and triggering mitigation of, DNS amplification attacks according to one example. The threat intelligence system 112 may include, without limitation, a threat analyzer 200, a threshold manager 202, and a threat mitigation system 204. Although the threat analyzer 200, threshold manager 202, and threat mitigation system 204 are depicted in FIG. 2 as separate components, a person of skill in the art should recognize that these components 200, 202, 204 may be combined into a single component, or one or more of the components may be further subdivided into additional sub-components as will be appreciated by a person of skill in the art.

In one example, the threat analyzer 200 is configured to collect traffic information (e.g., from the traffic monitoring system 106), and information on DNS responses by the one or more DNS resolvers 102, and analyze the information for determining a DNS amplification attack. The traffic information may include flow summaries generated by the traffic monitor. For example, the flow summaries may include identification of the source IP addresses generating requests directed to the network environment, size of the requests, timestamp information, and/or the like. The information provided by one or more of the DNS resolvers 102 may include, without limitation, identification of the DNS resolver, size of received queries, timestamp of the received queries, and size of responses (e.g., payload size) generated in response to the queries.

In one example, the threat analyzer 200 analyzes the information from the traffic monitoring system 106, and the information from the DNS resolver(s) 102 for identifying evidence of a DNS amplification attack. For example, the threat analyzer 200 may detect evidence of a DNS amplification attack if the rate of requests received from a source IP address exceeds a threshold rate. The threshold rate may be set based on analysis of historical data, and may be time-based. For example, a threat count for a DNS amplification attack for the source IP address may be increased in response to detecting a rate of requests that exceeds the threshold rate, within a first preset window of time (e.g., the past X minutes).

In another example, the threat count for a DNS amplification attack for the source IP address may be increased in response to detecting DNS responses that exceed a current threshold payload size, within a second preset window of time (e.g., in the past Y minutes). The first and second preset windows of time may be the same or different.

In one example, the threat analyzer 200 detects a DNS amplification attack if the threat count for such an attack exceeds an applicable threshold. If the threat count exceeds the applicable threshold, the threat mitigation system 204 may cause one or more mitigation actions to be taken.

The threat mitigation action may include generating a filter announcement to institute a filter in the router 108. The filter may also be instituted in a separate scrubbing system, third party filtering system, and/or the like. For example, the threat mitigation system 204 may deploy a filtering announcement (e.g., the filtering announcement 110 of FIG. 1) that contains a filtering rule, onto the router 108. The filtering rule (e.g., a FlowSpec rule) may be to drop or ignore any DNS response data packets directed to an IP address (e.g., the spoofed IP address), that is bigger that a preset threshold payload size. The filtering rule may be implemented for a preset period of time, until the condition causing the mitigation action to be taken has been remedied, or until an administrator of the threat mitigation system 204 determines the threat mitigation action is no longer necessary, among other options. As discussed, the filtering announcement (or a separate filtering announcement) may be sent to the DNS resolver 102 and/or authoritative DNS server 114 to instruct such systems to drop or refuse to generate a response to a DNS query if such response is determined, or likely, to exceed the then-current threshold payload size.

In one example, the threshold manager 202 includes at least one machine learning model for setting a maximum threshold payload size of the DNS response that one or more IP source addresses may receive before being filtered. The threshold payload size may vary based on one or more factors, such as, for example, the IP source address receiving a DNS response, the DNS resolver 102 generating the DNS response, and/or the like.

In one example, the machine learning model includes a deep learning neural network model with one or more layers, such as an input layer that receives current network statistics, an output layer that outputs a recommended threshold payload value, and one or more intermediate layers. The one or more layers of the neural network may represent different groups or sets of artificial neurons, which can represent different functions on the input data. The artificial neurons may apply different weights in the functions applied to the input data to attempt to identify an optimal threshold payload value.

In one example, the machine learning model is trained and/or tuned based on labeled training data sets. The labeled training data sets may include labeled examples of traffic during a DNS amplification attack. The threshold payload value set by the threshold manager 202 during training may be verified and/or tuned based on the training data sets. In some examples, the machine learning model is trained using an unsupervised training mechanism. Regardless of the particular training mechanism, the threshold manager 202 periodically adjusts the threshold payload value for optimizing the filtering of DNS responses generated based on malicious queries, while minimizing the filtering of DNS responses generated based on legitimate queries. In examples, the updated threshold payload value is communicated by threshold manager 202 to one or more network elements (such as routers 108 and DNS servers 102, 114) in an updated filter announcement.

Figure 3:
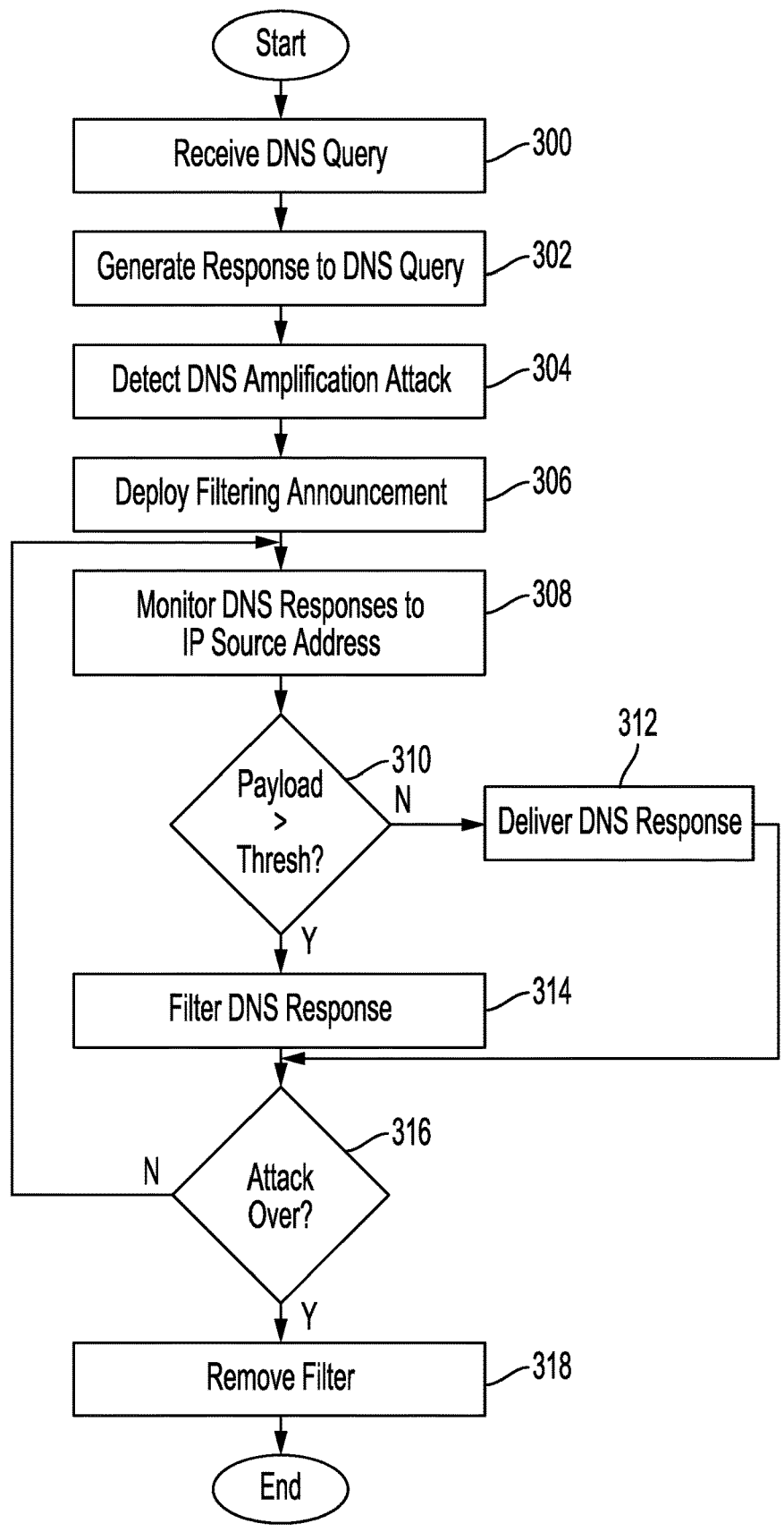
FIG. 3 is a flow diagram of a process for mitigating DNS amplification attacks according to one example.

FIG. 3 is a flow diagram of a process for mitigating DNS amplification attacks according to one example. It should be understood that the sequence of steps of the process is not fixed, but can be modified, changed in order, performed differently, performed sequentially, concurrently, or simultaneously, or altered into any desired sequence, as recognized by a person of skill in the art.

The process starts, and in act 300, a DNS query is received, by, for example, the DNS resolver 102. During a DNS amplification attack, the DNS query is transmitted by a spoofing device such as, for example, the spoofing device 100 of FIG. 1. In this case, the DNS query may list, as a source IP address, the address of a compromised target system (e.g., the target system 104 of FIG. 1).

In act 302, the DNS resolver 102 receives the DNS query and generates a DNS response. The DNS response may include a payload having a payload size.

In act 304, a DNS amplification attack is detected. For example, the threat intelligence system 112 may detect the DNS amplification attack based on traffic flow information from the traffic monitoring system 106, information (e.g., size) of DNS queries from the DNS resolver 102, and/or information (e.g., size) of responses from the DNS resolver 102. For example, the threat intelligence system 112 may analyze the traffic flow information from sampled packets for determining the rate of requests received from a source IP address. A rate (or increase in rate) that exceeds a threshold rate may evidence a DNS amplification attack.

The threat intelligence system 112 may also analyze the payload size of the sampled DNS response packets. For example, a payload size (e.g., average or median size) that exceeds a threshold size (e.g., X bytes) may evidence a DNS amplification attack. In another example, a ratio of the size of the DNS response to the size of the DNS request (referred to as an amplification factor) that exceeds a threshold amplification factor may evidence a DNS amplification attack.

In one example, a plurality of the DNS resolvers 112 provide information on the DNS queries and/or responses for evaluation by the threat intelligence system 112. For example, an attacker may distribute the DNS requests over multiple DNS resolvers in order to keep the rate of the requests under the threshold rate. In order to address this scenario, the threat intelligence system 112 may be configured to aggregate the DNS requests received by the multiple DNS resolvers to calculate an aggregate rate of the requests. An aggregate rate of the DNS queries that exceed the threshold rate may evidence a DNS amplification attack.

In act 306, a filtering announcement, similar to the filtering announcement 110 of FIG. 1, is deployed in response to detecting the DNS amplification attack. The filtering announcement may be a FlowSpec filtering announcement deployed in one or more of the routers 108. The filtering announcement may specify one or more filtering rules for filtering data packets that satisfy the filtering rule. For example, the filtering rule may include a particular IP address (e.g., the spoofed IP source address of the target system 104), and the threshold payload size above which the data packet is to be filtered. In some examples, the filtering rules are deployed in one or more the DNS resolver 102.

In act 308, the router 108 (or the DNS resolver 102) with the configured filtering rule, monitors the DNS responses addressed to the IP source address.

In act 310, a determination is made as to whether the payload of a particular DNS response exceeds the threshold payload size identified in the filtering rule. If the payload of the DNS response is below the threshold payload size, the DNS response is delivered to the querying IP source address in act 312. If the payload of the DNS response is above the threshold payload size, the DNS response is filtered in act 314.

In act 316 a determination is made as to whether the DNS amplification attack is over. In one example, a DNS amplification attack may be deemed to be over based on traffic flow information from the traffic monitoring system 106, information (e.g., size) of DNS queries from the DNS resolver 102, and/or information (e.g., size) of responses from the DNS resolver 102. For example, the threat intelligence system 112 may analyze the traffic flow information for determining the rate of requests received from a source IP address. A rate that is below a threshold rate for a given window of time (e.g., the past Y minutes) may evidence that the DNS amplification attack has ended.

The threat intelligence system 112 may also analyze the payload size of the DNS response packets. For example, an average or median payload size that is below a threshold size (e.g., in the past Z minutes), may evidence an end of the DNS amplification attack. In another example, a ratio of the size of the average/median DNS response to the size of the average/median DNS request (referred to as an amplification factor) that is below a threshold amplification factor may evidence end of the DNS amplification attack.

If the attack is deemed to over, the filter rule may be removed or deactivated from the router 108 (or DNS resolver 102). It will also be appreciated that if the threshold manager 202 modifies a threshold payload size for filters to be applied to traffic for a particular IP address, then a new filtering announcement may be issued (operation 306) and the subsequent operations may be repeated for the new filtering announcement. In other examples, no new filtering announcement is deployed, but the updated threshold payload size for filtering may be passed as a parameter to any devices already implementing a filter for the applicable source IP address so that subsequent filtering is done using the updated threshold payload size. As discussed, the threshold payload size may be periodically or continuously updated.

Figure 4:
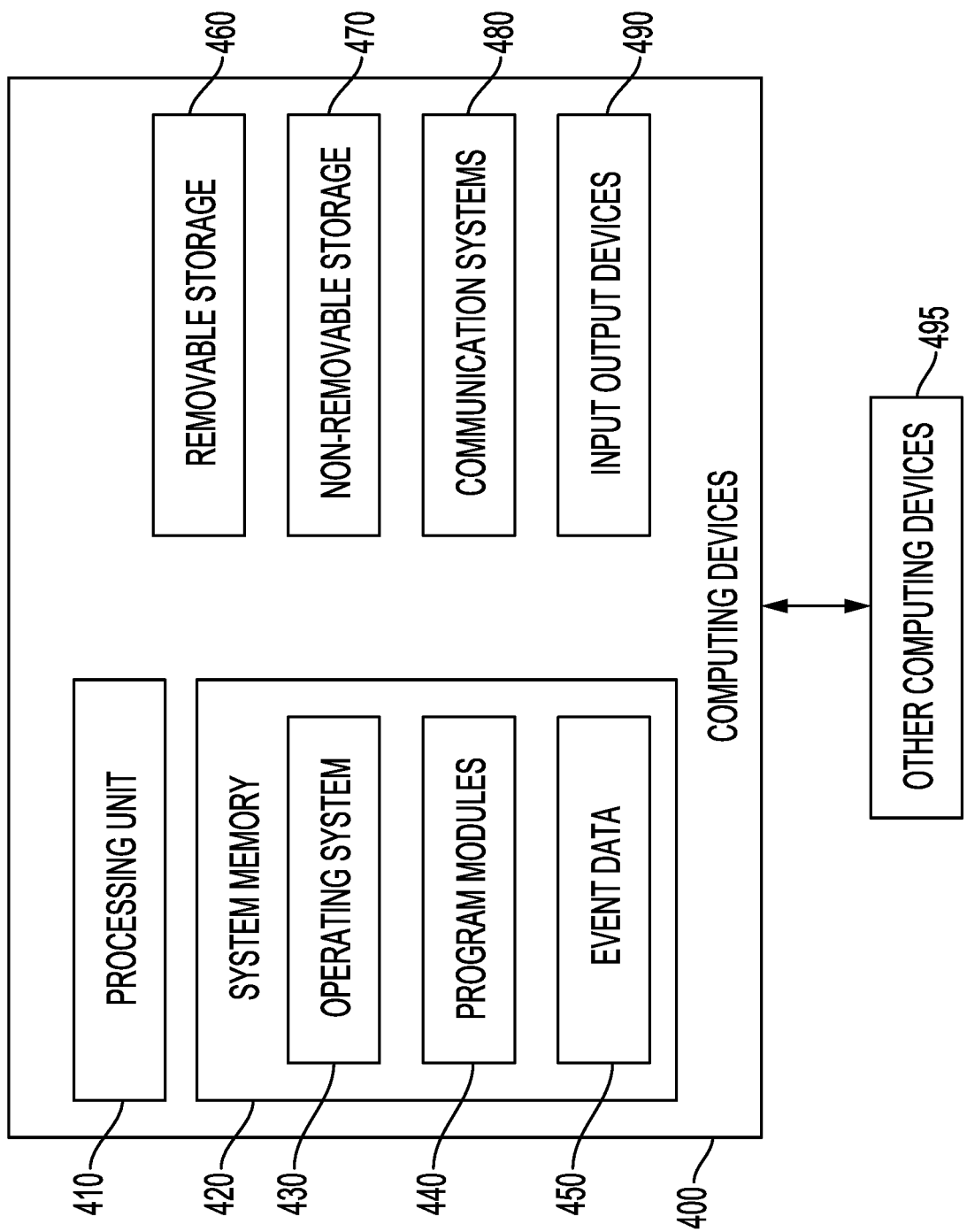
FIG. 4 is a block diagram of a computing device according to one example.

FIG. 4 is a block diagram of a computing device 400 according to an example. The computing device 400, or various components and system of the computing device 500, may be integrated or associated with the DNS resolvers 102, target systems 104, traffic monitor 106, routers 108, threat intelligence system 112, and authoritative DNS 114 of FIG. 1. As shown in FIG. 4, the physical components (e.g., hardware) of the computing device are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible mitigating DNS amplification attacks according to the various examples of the present disclosure. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, servers, routers, network devices, client computing devices, etc. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include non-transitory computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media may be tangible and non-transitory and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The terminology used herein is for the purpose of describing particular examples only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing examples of the inventive concept refers to "one or more embodiments of the present disclosure." Also, the term "exemplary" is intended to refer to an example or illustration. As used herein, the terms "use," "using," and "used" may be considered synonymous with the terms "utilize," "utilizing," and "utilized," respectively.

As will be apparent to those of skill in the art, examples of the present systems and methods have multiple technical effects, including saving computing resources, bandwidth usage, and user productivity, by preventing or making more difficult DNS amplification attacks, among other advantages.

In an aspect, the present technology includes a method comprising: analyzing network traffic information; identifying a domain name system (DNS) amplification attack based on the network traffic information; in response to identifying the DNS amplification attack, invoking a threat mitigation action; receiving a domain name system (DNS) query from a source address; determining, by a DNS server, that a payload size of a response to the DNS query exceeds a threshold payload size; and dropping the response to the DNS query based on the threat mitigation action.

In an example, and in combination with any of the above aspects and examples, the detecting of the DNS amplification attack includes: identifying a rate of traffic from the source address for a certain period of time; and determining that the rate of the traffic exceeds a threshold rate.

In another example, and in combination with any of the above aspects and examples, the detecting of the DNS amplification attack includes: examining payloads of a plurality of first responses generated by the DNS server for a certain period of time; and determining that one or more payloads of the plurality of first responses exceeds the threshold payload size.

In another example, and in combination with any of the above aspects and examples, the detecting of the DNS amplification attack includes: determining a historical ratio based on one or more historical DNS queries and one or more historical responses; determining a current ratio based on recent DNS queries and their associated DNS responses during a particular time period; and determining that a difference between the current ratio and the historical ratio exceeds a threshold value.

In another example, and in combination with any of the above aspects and examples, the threat mitigation action includes deploying a filtering rule to filter the response to the DNS query.

In another example, and in combination with any of the above aspects and examples, the filtering rule is deployed on a router for filtering the response to the DNS query.

In another example, and in combination with any of the above aspects and examples, the filtering rule is deployed on the DNS server for filtering the response to the DNS query.

In another example, and in combination with any of the above aspects and examples, the filtering rule includes the source address and the threshold payload size.

In another example, and in combination with any of the above aspects and examples, the method further includes determining the threshold payload size dynamically based on a machine learning model and previous responses to DNS queries within a specified time period.

In another example, and in combination with any of the above aspects and examples, the DNS server calculates an anticipated payload size of the response prior to generating the response and wherein dropping the response to the DNS query comprises not generating the response.

In another aspect, the present technology includes system, comprising: at least one processor; and memory, storing instructions that, when executed by the at least one processor, cause the system to perform a method. In an example, the method comprises: analyzing network traffic information; identifying a domain name system (DNS) amplification attack based on the network traffic information; in response to identifying the DNS amplification attack, invoking a threat mitigation action; receiving a domain name system (DNS) query from a source address; determining, by a DNS server, that a payload size of a response to the DNS query exceeds a threshold payload size; and dropping the response to the DNS query based on the threat mitigation action.

In another example, and in combination with any of the above aspects and examples, the detecting of the DNS amplification attack includes: identifying a rate of traffic from the source address for a certain period of time; and determining that the rate of the traffic exceeds a threshold rate.

In another example, and in combination with any of the above aspects and examples, the detecting of the DNS amplification attack includes: examining payloads of a plurality of first responses generated by the DNS server for a certain period of time; and determining that one or more payloads of the plurality of first responses exceeds the threshold payload size.

In another example, and in combination with any of the above aspects and examples, the detecting of the DNS amplification attack includes: determining a historical ratio based on one or more historical DNS queries and one or more historical responses; determining a current ratio based on recent DNS queries and their associated DNS responses during a particular time period; and determining that a difference between the current ratio and the historical ratio exceeds a threshold value.

In another example, and in combination with any of the above aspects and examples, the threat mitigation action includes deploying a filtering rule to filter the response to the DNS query.

In another example, and in combination with any of the above aspects and examples, the filtering rule is deployed on a router for filtering the response to the DNS query.

In another example, and in combination with any of the above aspects and examples, the filtering rule is deployed on the DNS server for filtering the response to the DNS query.

In another example, and in combination with any of the above aspects and examples, the filtering rule includes the source address and the threshold payload size.

In another example, and in combination with any of the above aspects and examples, the method further comprises determining the threshold payload size dynamically based on a machine learning model and previous responses to DNS queries within a specified time period.

In another aspect the present technology includes a system, comprising: at least one processor; and memory, storing instructions that, when executed by the at least one processor, cause the system to perform a method. In an example, the method comprises: analyzing network traffic information; identifying a domain name system (DNS) amplification attack based on the network traffic information; determining a threshold payload size dynamically based on a machine learning model and the network traffic information received within a specified first period; in response to identifying the DNS amplification attack, invoking a threat mitigation action, including distributing a filtering announcement to at least one network device, wherein the filtering announcement includes instructions to cause the at least one network device to: receive a current DNS query from a source address; receive a response to the current DNS query; determine that a payload size of the response to the current DNS query exceeds the threshold payload size; and drop the response to the DNS query based on determining that the payload size of the response to the current DNS query exceeds the threshold payload size; determining an updated threshold payload size dynamically based on the machine learning model and the network traffic information received within a specified second period; and distributing an updated filtering announcement with the updated threshold payload size to the at least one network device.

Although exemplary embodiments of systems and methods for mitigating DNS amplification attacks have been specifically described and illustrated herein, many modifications and variations will be apparent to those skilled in the art. Accordingly, it is to be understood that the systems and methods for mitigating DNS amplification attacks constructed according to principles of this disclosure may be embodied other than as specifically described herein. The disclosure is also defined in the following claims, and equivalents thereof.

What is claimed is:

1. A method comprising:
analyzing network traffic information;
identifying a domain name system (DNS) amplification attack based on the network traffic information;
determining a threshold payload size dynamically based on a machine learning model and the network traffic information received within a specified first period;
in response to identifying the DNS amplification attack, invoking a threat mitigation action, including distributing a filtering announcement to at least one network device;
receiving a domain name system (DNS) query from a source address;
receive a response to the DNS query;
determining, by a DNS server, that a payload size of a response to the DNS query exceeds the threshold payload size; and
dropping the response to the DNS query based on determining that the payload size of the response to the current DNS query exceeds the threshold payload size;
determining an updated threshold payload size dynamically based on the machine learning model and the network traffic information received within a specified second period; and
distributing an updated filtering announcement with the updated threshold payload size to at least one network device.

2. The method of claim 1, wherein the detecting of the DNS amplification attack includes:
identifying a rate of traffic from the source address for a certain period of time; and
determining that the rate of the traffic exceeds a threshold rate.

3. The method of claim 1, wherein the detecting of the DNS amplification attack includes:
examining payloads of a plurality of first responses generated by the DNS server for a certain period of time; and
determining that one or more payloads of the plurality of first responses exceeds the threshold payload size.

4. The method of claim 1, wherein the detecting of the DNS amplification attack includes:
determining a historical ratio based on one or more historical DNS queries and one or more historical responses;
determining a current ratio based on recent DNS queries and their associated DNS responses during a particular time period; and
determining that a difference between the current ratio and the historical ratio exceeds a threshold value.

5. The method of claim 1, wherein the threat mitigation action includes deploying a filtering rule to filter the response to the DNS query.

6. The method of claim 5, wherein the filtering rule is deployed on a router for filtering the response to the DNS query.

7. The method of claim 5, wherein the filtering rule is deployed on the DNS server for filtering the response to the DNS query.

8. The method of claim 5, wherein the filtering rule includes the source address and the threshold payload size.

9. The method of claim 1, further comprising determining the threshold payload size dynamically based on a machine learning model and previous responses to DNS queries within a specified time period.

10. The method of claim 1, wherein the DNS server calculates an anticipated payload size of the response prior to generating the response and wherein dropping the response to the DNS query comprises not generating the response.

11. A system, comprising:
at least one processor; and
memory, storing instructions that, when executed by the at least one processor, cause the system to perform a method, the method comprising:
analyzing network traffic information;
identifying a domain name system (DNS) amplification attack based on the network traffic information;
determining a threshold payload size dynamically based on a machine learning model and the network traffic information received within a specified first period;
in response to identifying the DNS amplification attack, invoking a threat mitigation action, including distributing a filtering announcement to at least one network device, wherein the filtering announcement includes instructions to cause the at least one network device to:
receive a current DNS query from a source address;
receive a response to the current DNS query;
determine that a payload size of the response to the current DNS query exceeds the threshold payload size; and
drop the response to the DNS query based on determining that the payload size of the response to the current DNS query exceeds the threshold payload size;
determining an updated threshold payload size dynamically based on the machine learning model and the network traffic information received within a specified second period; and
distributing an updated filtering announcement with the updated threshold payload size to the at least one network device.

12. The system of claim 11, wherein the detecting of the DNS amplification attack includes:
identifying a rate of traffic from the source address for a certain period of time; and
determining that the rate of the traffic exceeds a threshold rate.

13. The system of claim 11, wherein the detecting of the DNS amplification attack includes:
examining payloads of a plurality of first responses generated by the DNS server for a certain period of time; and
determining that one or more payloads of the plurality of first responses exceeds the threshold payload size.

14. The system of claim 11, wherein the detecting of the DNS amplification attack includes:

determining a historical ratio based on one or more historical DNS queries and one or more historical responses;

determining a current ratio based on recent DNS queries and their associated DNS responses during a particular time period; and determining that a difference between the current ratio and the historical ratio exceeds a threshold value.

15. The system of claim 11, wherein the threat mitigation action includes deploying a filtering rule to filter the response to the DNS query.

16. The system of claim 15, wherein the filtering rule is deployed on a router for filtering the response to the DNS query.

17. The system of claim 15, wherein the filtering rule is deployed on the DNS server for filtering the response to the DNS query.

18. The system of claim 15, wherein the filtering rule includes the source address and the threshold payload size.

19. The system of claim 11, wherein the method further comprises determining the threshold payload size dynamically based on a machine learning model and previous responses to DNS queries within a specified time period.

* * * * *